(No Model.) 2 Sheets—Sheet 2.
W. D. BOHM.
APPARATUS FOR LEACHING ORES.
No. 507,350. Patented Oct. 24, 1893.
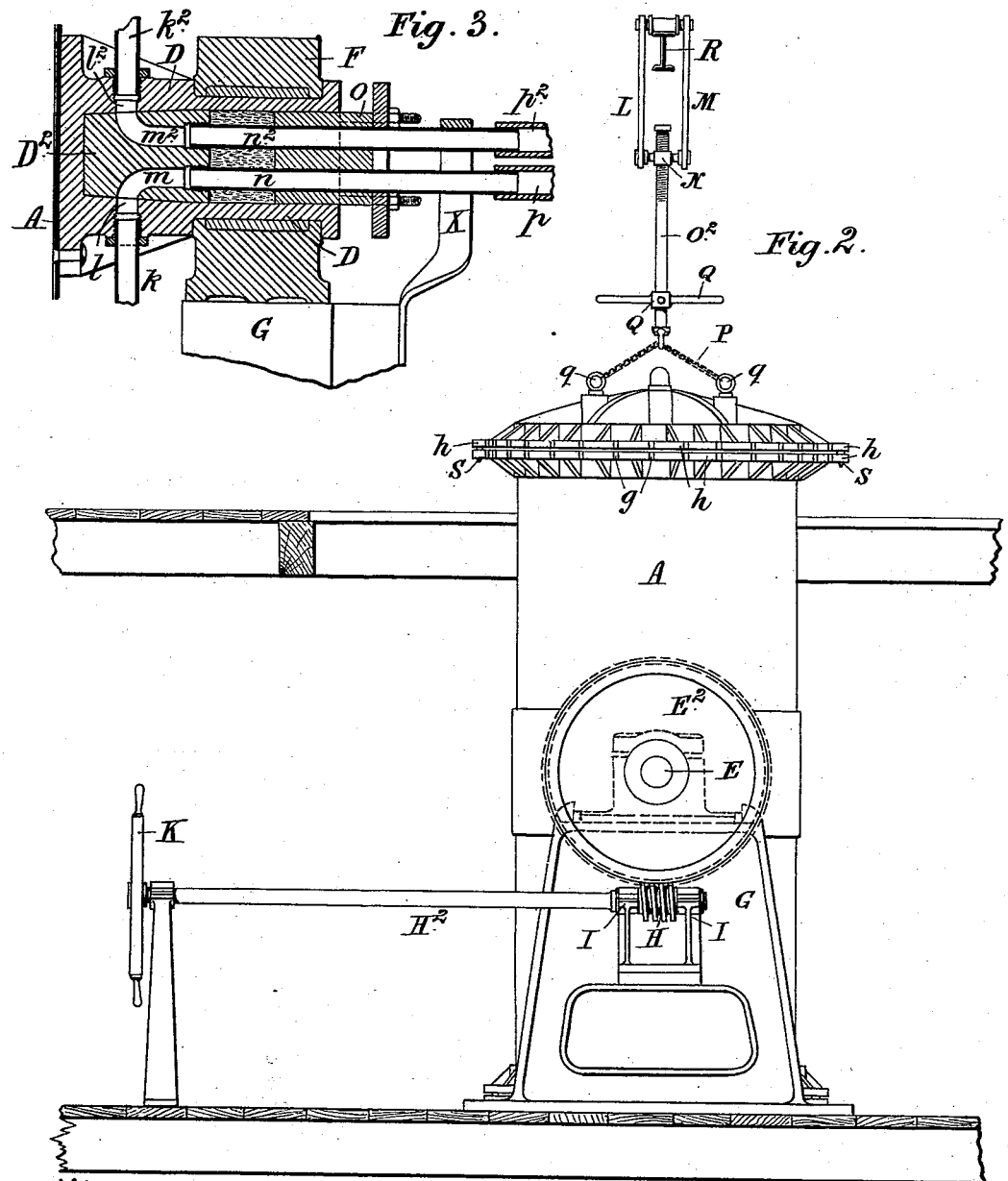
WITNESSES
George Baumann
James Gracie
INVENTOR
William D. Bohm
By his attorneys
Howson & Howson

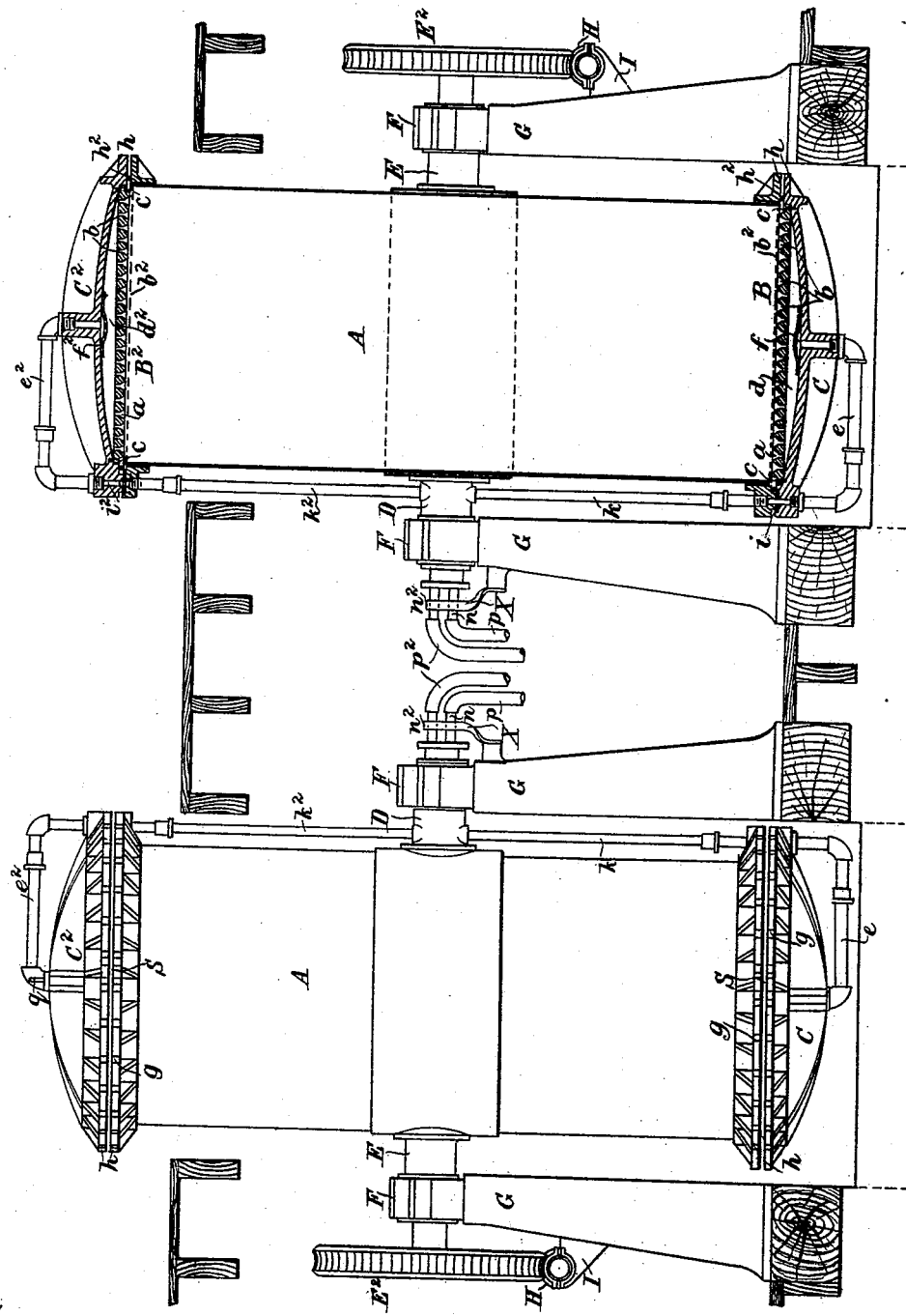

UNITED STATES PATENT OFFICE.

WILLIAM D. BOHM, OF LONDON, ENGLAND.

APPARATUS FOR LEACHING ORES.

SPECIFICATION forming part of Letters Patent No. 507,350, dated October 24, 1893.

Application filed December 28, 1891. Serial No. 416,305. (No model.)

*To all whom it may concern:*

Be it known that I, WILLIAM DUNSMORE BOHM, metallurgical chemist and engineer, a subject of the Queen of Great Britain and Ireland, residing at 51 Avenue Road, Acton, London, in the county of Middlesex, England, have invented certain Improvements in Apparatus for Leaching Ores in Separating Gold and Silver Therefrom, of which the following is a specification.

My invention relates to apparatus wherein leaching of the ore is effected by the upward passage through a vat, or vessel, of the leaching liquid which passes through a filter at the upper part of the vat, or vessel. In treating certain ores this filter, as such vats or vessels have been hitherto arranged, is liable to become clogged and the working of the apparatus impeded, or a greatly increased pressure is necessary to force the solution through the filter.

According to my invention I provide a vat, or vessel, which has a filter both at top and at bottom, and an inlet, or outlet, as the case may be. The said vat, or vessel, can be turned upon trunnions, or equivalent bearings, by means of a worm and worm wheel, or other suitable means. Through the bearings, or through one of the bearings, are led the passages by which liquid is forced into and passes from the vat, or vessel, which vat, or vessel, is provided with pipes, or passages, leading from these passages in the bearing, or bearings, to the aforesaid outlet and inlet. At intervals the vat, or vessel, is given a partial rotation so that the filter which was uppermost becomes undermost and the communications are at the same time reversed and the solution is admitted through the filter which was before above, and consequently in operation, thus clearing the said filter while the filtering operation is carried on by the filter which is now at top. Thus by reversing the vat, or vessel, at intervals, an efficient filtering is maintained continuously, without stopping the pump. And in order that my said invention may be fully understood I shall now proceed more particularly to describe the best means with which I am acquainted for carrying it into effect, and, for that purpose, shall refer to the several figures of the annexed drawings, the same letters of reference indicating corresponding parts in all the figures.

Figure 1 shows two leaching vats constructed according to my invention, one of the said vats being shown in elevation and the other in section. Fig. 2 is an elevation of one of the vats, at right angles to Fig. 1, showing means for turning it upside down, and Fig. 3 is a longitudinal section, drawn to an enlarged scale, showing the passages through one of the trunnions on which the vats turn.

Each vat A, is provided at each of its opposite ends with a filter B, $B^2$, which may consist of iron wire-netting; or of teak-wood, having grooves $a$, in its inner face and perforated with holes $b$, situated in the grooves and covered with filter-cloth $b^2$. These disks are secured by screws $c$, or other convenient means, to the covers C, $C^2$, there being spaces $d$, $d^2$, between the disks and the covers, with which spaces the pipes $e, e^2$, communicate. Through these pipes the leaching liquid passes to, and from, the vats. The outlets from these pipes, into the said spaces, are covered by perforated plates, or roses, $f$, $f^2$, to cause the inflowing solution to spread evenly throughout the spaces $d$, $d^2$. The said pipes are fixed to the covers C, $C^2$, so as to be removed with the covers when detached, for the purpose of charging the vats with the ore to be treated. The covers are secured to the body of the vat by bolts and nuts secured in notches $g$, formed in flanges $h$, provided on the covers C, $C^2$, and the body A, so as to permit of the bolts being readily removed, and replaced, and the covers detached, and fixed, rings of india-rubber, or other suitable packing rings, $h^2$, being interposed between the flanges to render the joints fluid-tight. The pipes $e, e^2$, in the covers C, $C^2$, communicate (when the covers are fixed in position on the body of the vat) by passages $i$ $i^2$, in the flanges $h$, with pipes $k$ $k^2$, connected to one of the trunnions on which the vat turns. This trunnion, as shown in Fig. 3, consists of two parts D $D^2$, the part D, being fixed to the vat A and fitted to turn on the part $D^2$, which is held stationary by the fastening X embracing the pipes $n^2$ as shown.

The trunnions D, E, (Fig. 1) are mounted in bearings F, carried on standards G, at a suitable height to admit of the vat being turned upside down. The part D, of the trunnion (Fig. 3), is provided with passages $l\ l^2$, with which the pipes $k\ k^2$ communicate, and in the part $D^2$ of the trunnion are passages $m\ m^2$, which communicate with the passages $l\ l^2$. Into the passages $m\ m^2$ are screwed pipes $n\ n^2$, which pass through a gland O, fitted into the outer end of the part D.

To the outer end of the pipe $n$, is secured a flexible tube $p$ leading to the delivery end of a force pump, or other device, by means of which the leaching liquor is forced into the vat, and the pipe $n^2$, is connected to another flexible pipe $p^2$, which may lead to the vessel from which the pump draws the leaching liquor to force into the vat.

The vat A, being charged with the ore to be treated, leaching liquor is forced upward therethrough, the said liquor being conducted by the pipe $n$ and passage $m$ in the part $D^2$ of the trunnion into the passage $l$ in, and pipe $k$ connected to, the part D of the trunnion, and to the pipe $e$, fixed to the cover C of the vat. The liquor enters the space $d$ between the cover C and the filter B and passes thence through the filter B, and upward through the ore in the vat. It then passes through the upper filter $B^2$, into the space between the said filter and the cover $C^2$ and out therefrom by the pipe $e^2$ into the pipe $k^2$ by which it is conducted into the passage $l^2$ in the part D, of the trunnion, and passes thence by the passage $m^2$, and pipe $n^2$, in the part $D^2$, into the pipe $p^2$ by which it may be conducted back to the vessel from which it was drawn by the pump or forcing device or to other suitable place. An upwardly forced circulation of the leaching liquor through the ore contained in the vat is thus effected and this circulation may be maintained for any desired length of time and then the vat may be turned on its trunnions, upside down, so as to reverse the passages, the passage $l$ in the part D, communicating with the passage $m^2$, in the part $D^2$ and the passage $l^2$, in the part D, communicating with the passage $m$ in the part $D^2$. The liquor passes through the ore in the same direction as before but, as the filter $B^2$, which is shown in the drawing uppermost, is now lowermost, and the filter B, which is shown lowermost, is now uppermost, a clear, or comparatively clear, filter is presented at top, and the lower filter becomes cleared of matter which may have clogged it.

A convenient means for turning, or reversing, the position of the vat is shown in the drawings. It consists of a worm-wheel $E^2$, fast on the trunnion E of the vat, with which worm-wheel gears a worm H mounted on a spindle $H^2$ carried in bearings I. The spindle $H^2$ is provided with a hand wheel K by means of which the worm H, may be rotated, and, through the wheel $E^2$, give partial rotation to the vat as required.

L shows an arrangement for raising the lids, or covers C, $C^2$, when unfastened from the body A. It consists of a frame M, carrying a swiveling nut N, in which works a screw $O^2$ carrying chains P which are attached to the cover by eyes $q$ when it is to be raised. When the chains are attached to the cover the screw $O^2$ is turned in the nut N by means of handles Q, so as to raise the cover from the body and then the frame M, together with the cover, may be run along a rail R, from over the body A. To insure the cover being properly placed in position on the body A the cover is provided with projections S which enter sockets formed in, or attached to, the body A of the vat.

Having now particularly described and ascertained the nature of my said invention and in what manner the same is to be performed, I declare that what I claim is—

With a leaching vat, the combination of filters, one at each end of the vat, trunnions or bearings upon or in which the vat can be reversed and inlet and outlet pipes communicating with the trunnion or bearing and thence passing to each end of the vat outward of each filter the part of the trunnion bearing through which the inlet and outlet passages are established being constructed to reverse the passages when the vat is reversed, substantially as hereinbefore described.

In testimony whereof I have signed my name to this specification in the presence of two subscribing witnesses.

WM. D. BOHM.

Witnesses:
   CHAS. MILLS,
   WILLIAM F. UPTON,
*Both of 47 Lincoln's Inn Fields, London, W. C.*